(12) United States Patent
Xiao et al.

(10) Patent No.: US 11,875,064 B2
(45) Date of Patent: *Jan. 16, 2024

(54) SOLID STATE DRIVE SUPPORTING BOTH BYTE ADDRESSABLE PROTOCOL AND BLOCK ADDRESSABLE PROTOCOL

(71) Applicant: Kioxia Corporation, Tokyo (JP)

(72) Inventors: Edward Xiao, Alameda, CA (US); Scott Stetzer, Foothill Ranch, CA (US)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,658

(22) Filed: Mar. 18, 2022

(65) Prior Publication Data

US 2022/0206721 A1 Jun. 30, 2022

Related U.S. Application Data

(63) Continuation of application No. 16/570,521, filed on Sep. 13, 2019, now Pat. No. 11,314,460.

(51) Int. Cl.
*G06F 3/06* (2006.01)
*G06F 13/42* (2006.01)

(52) U.S. Cl.
CPC .......... *G06F 3/0679* (2013.01); *G06F 3/0659* (2013.01); *G06F 13/4282* (2013.01);
(Continued)

(58) Field of Classification Search
None
See application file for complete search history.

(56) References Cited

U.S. PATENT DOCUMENTS 7,028,051 B1 * 4/2006 McMullan ............ H04L 67/142
10,318,185 B2 6/2019 Hady
(Continued)

FOREIGN PATENT DOCUMENTS

WO 2018/004987 A1 1/2018

OTHER PUBLICATIONS

Zhitang Song et al., "From Octahedral Structure Motif to Sub-Nanosecond Phase Transitions in Phase Change Materials for Data Storage", Science China Information Sciences, Aug. 2018, vol. 61, pp. 1-16.

(Continued)

*Primary Examiner* — Charles Rones
*Assistant Examiner* — Hewy H Li
(74) *Attorney, Agent, or Firm* — Allen & Overy LLP (57) ABSTRACT

A solid state drive (SSD) enabled to process and store block addressable and byte addressable data, includes a first storage region for storing byte addressable data, a second storage region for storing block addressable data, and an SSD controller coupled to the first storage region and the second storage region by a bus. The SSD controller includes a processor and an interface for receiving data packets from a host. The SSD controller receives a data packet from the host at the interface, determines whether the data packet includes byte addressable data or block addressable data at the processor, selects either the first storage region or the second storage region based on the determination, and stores the data associated with the data packet in the selected storage region.

21 Claims, 5 Drawing Sheets

(52) U.S. Cl.
CPC ......... *G06F 2212/1024* (2013.01); *G06F 2212/2022* (2013.01)

(56) References Cited

U.S. PATENT DOCUMENTS

| | | | |
|---|---|---|---|
| 10,977,201 B1 | 4/2021 | McKay et al. | |
| 2006/0143710 A1 | 6/2006 | Desai et al. | |
| 2014/0181365 A1* | 6/2014 | Fanning | G06F 3/0688 |
| | | | 711/103 |
| 2016/0378337 A1 | 12/2016 | Horspool et al. | |
| 2017/0017402 A1* | 1/2017 | Zheng | G06F 3/0634 |
| 2018/0018171 A1 | 1/2018 | Amidi et al. | |
| 2018/0173419 A1* | 6/2018 | Dubeyko | G06F 3/0688 |
| 2019/0042413 A1 | 2/2019 | Wysocki et al. | |
| 2020/0192850 A1 | 6/2020 | Caruk et al. | |

OTHER PUBLICATIONS

Daniel Bittman et al., "Optimizing Systems for Byte-Addressable NVM by Reducing Bit Flipping," USENIX Association, 17th USENIX Conference on File and Storage Technologies, Feb. 25-28, 2019, pp. 16-30.

Shauradou. "Gen-Z Primer for Early Adoptors", <https://www.plda.com/blog/category/technical-article/gen-z-primer-early-adopters>, Nov. 2018. (Year:2018).

Chen, Jerry C. "Multi-Gigabit SerDes: The Cornerstone of High Speed Serial Interconnects". <https://web.archive.org/web/20151220063228/https://www/design-reuse.com/articles/10541/multi-gigabit-serdes-the-cornerstone-of-high-speed-serial-interconnects.html>. Dec. 2015. (Year: 2015).

Mellor, Chris. "Escaping the DRAM price trap: Storage Class Memory, what it is and why it matters", Nov. 2018. <https://blocksandfiles.com/2018/11/28/2019-the-year-of-storage-class-memory/>, (Year: 2018).

Linux Information Project, "Packet Header Definition", <Packet Header Definition, <http://www.linfo.org/packet_header.html#:-:text=A%20packet%20header%20is%20the, to%20reach%20its%20intended%20destination.>. Dec. 2005, (Year:2005).

Ivet, "Demystifying: What is NVMeOF?", Sep. 2017, <https://storpool.com/blog/demystifying-what-is-nvmeof>, (Year: 2017).

Maxfield, Max. "ASIC, ASSP, SoC, FPGA—What's the Difference?". Jun. 2014. <https://www/eetimes.com/asic-assp-soc-fpga-whats-the-difference/#>. (Year: 2014).

* cited by examiner

SOLID STATE DRIVE SUPPORTING BOTH BYTE ADDRESSABLE PROTOCOL AND BLOCK ADDRESSABLE PROTOCOL

CROSS-REFERENCE TO RELATED APPLICATIONS

This application is a continuation of U.S. application Ser. No. 16/570,251 filed on Sep. 13, 2019; the entire contents of which are incorporated herein by reference.

FIELD OF INVENTION

The present invention generally relates to systems and methods to process command packets utilizing either byte addressable protocol or block addressable protocol.

BACKGROUND OF INVENTION

Solid state drives (SSDs) include controllers which allow the SSD to receive and process command packets from a central processing unit (CPU). The controller includes logic that allows the controller to decode and process the received data packet. Conventionally, the logic allows the controller to process command packets of a specified type according to the type of memory available and internal hardware of the controller, SSD, and storage regions.

Typically an SSD uses a storage protocol which is a block addressable protocol. Block addressable transfer protocol enables the SSD to read and write a fixed block of data, originally associated with hard disk protocols storing fixed-size data blocks in sectors of a hard disk platter which were addressed using a logical block address (LBA). Example protocols included small computer system interface (SCSI) and advanced technology attachment/serial advanced technology attachment (ATA/SATA). Later, specific protocols were introduced for SSDs composed of non-volatile memory (NVM), but which still retained the concept of transferring data in fixed size blocks addressable by LBAs. Examples of NVM storage protocols include the non-volatile memory express (NVMe) protocol, a block addressable protocol. In contrast, memory devices attach to a CPU via a memory bus using a byte-level transfer protocol, according to a protocol standard such as double date rate 3 (DDR3), double data rate 4 (DDR4), etc. Prior to the development of NVM technologies like NAND flash, these devices were volatile, examples including dual in-line memory modules (DIMMs) composed of dynamic random access memory devices (DRAMs). More recently, persistent memory devices such as NVDIMMs (non-volatile DIMMs) have been developed composed of both DRAM and NAND flash memory devices, but still employing DDR-type byte-level protocols. At present, SSDs are designed for processing data according to only block level transfer protocols and memory devices are designed for processing data according to only byte-level protocols.

Accordingly, there is a long felt need for SSDs to be capable of efficiently processing data packets using both byte addressable and block addressable protocols.

BRIEF DESCRIPTION OF THE INVENTION

In an aspect, an SSD enabled to process and store block and byte addressable data includes a first storage region configured to store by addressable data, a second storage region configured to store block addressable data, and a controller communicatively coupled to the first storage region and the second storage region by a bus. The controller includes a processor and an interface configured to receive data packets from a host. The controller receives a data packet from the host at the interface, determines whether the data packet includes byte addressable data or block addressable data, and selects either the first storage region or the second storage region based on the determination. The controller stores the data associated with the data packet in the selected storage region.

In another aspect, a method for storing data in an SSD having a first storage region for storing byte addressable data, a second storage region for storing block addressable data, and a controller communicatively coupled to the first storage region and the second storage region by a bus includes receiving, at an interface of the controller, a data packet from a host, and determining, at a processor of the controller, whether the data packet includes byte addressable data or block addressable data. The method also includes selecting either of the first storage region or the second storage region based on the determination and storing the data associated with the data packet in the selected storage region.

DETAILED DESCRIPTION OF THE INVENTION

SSD versatility and longevity may be improved by enabling SSDs to process and store data according to both byte addressable and block addressable protocols. Incorporating block and byte addressable storage into the SSD improves the lifetime of the device, because if the byte-addressable storage becomes unavailable block addressable storage may remain available. U.S. patent application Ser. No. 16/570,455, titled "Reconfigurable SSD Storage Pool," filed Sep. 13, 2019 and concerning reclassification of storage in an SSD is incorporated by reference herein in its entirety.

Enabling an SSD to process and store data packets according to both block and byte addressable protocols requires that the SSD controller and storage regions be equipped to identify and interpret data packets according to both protocols, and requires that the SSD hardware and host be able to transfer and store the data packets.

Figure 1:
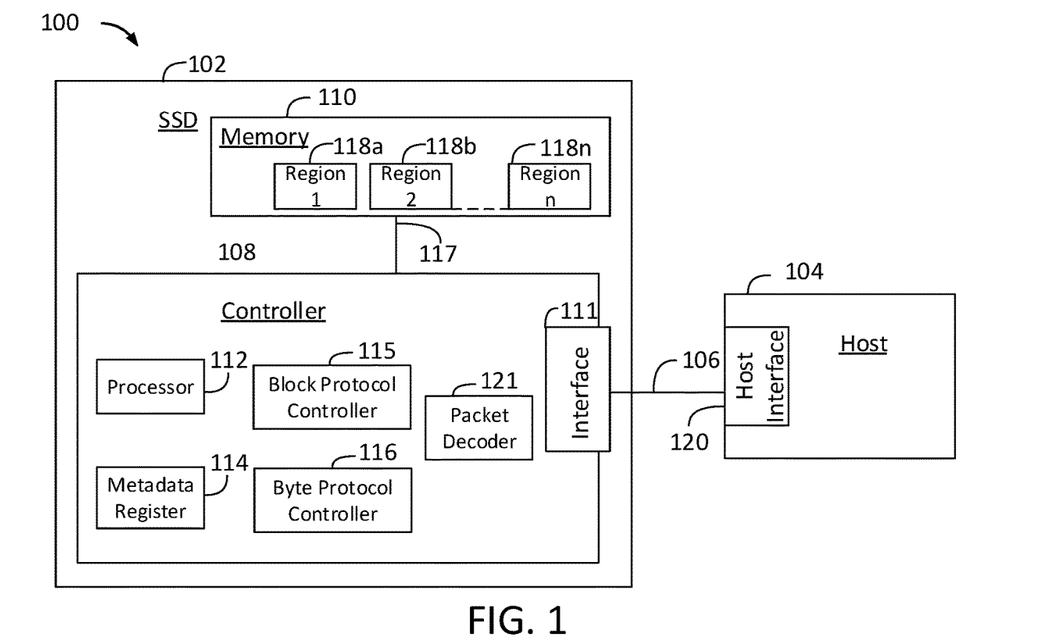
FIG. 1 shows a block diagram of a hybrid SSD system supporting byte addressable protocol and block addressable protocol.

FIG. 1 shows a block diagram of a hybrid SSD system 100 supporting byte addressable protocol and block addressable protocol. SSD system 100 includes an SSD 102 and host 104 coupled by a bus 106. The SSD 102 includes SSD controller 108 having processor 112, metadata register 114, packet decoder 121, and block addressable protocol controller 115 and byte addressable protocol controller 116. The SSD 102 also includes interface 111 and memory 110 including a plurality of storage regions 118a-118n. The SSD controller 108 is coupled to the memory by channel 117. The host 104 includes host interface 120.

The channel or bus 106 couples the host 104 to the SSD 102. The host 104 transmits and receives data packets at the host interface 120. The data packets transmitted and received by the host include command packets, as well as data for storage in the SSD 102, sometimes referred to as a command payload.

The SSD controller 108 receives data packets at the interface 111 and passes the data packets to the packet decoder 121. The packet decoder 121 determines the transfer protocol of the received data packet, either byte addressable protocol or block addressable protocol, and transmits the data packet to the appropriate protocol controller for encoding. The packet decoder 121 identifies whether the data packet includes an identifier that indicates that the contents of the data packet are byte addressable or block addressable. If the packet decoder 121 determines that the data packet uses a byte addressable protocol, the packet decoder 121 passes the data packet to the byte addressable protocol controller 116 for decoding. If the packet decoder 121 determines that the data packet uses a block addressable protocol, the packet decoder 121 passes the data packet to the block addressable protocol controller 115 for decoding. The packet decoder 121 further updates the metadata register 114 with the type and destination of the data in the data packet. The method by which the packet decoder 121 determines the appropriate protocol for the data packet is described in greater detail below.

When the packet decoder 121 identifies the data packet as byte addressable, the byte addressable protocol controller 116 processes the data packet by decoding the header and data in the data packet and transferring the data to the appropriate storage region of the plurality of storage regions 118a-118n. The byte addressable protocol controller 116 prompts the processor 112 to update the metadata register 114 with the byte addressable information. As will be explained below, in some implementations, if the data packet does not include an identifier as to the type of transfer protocol, the packet decoder 121 transmits the data packet to the byte addressable protocol controller 116 as a default. In some implementations, the byte addressable protocol hander 116 is a Gen-Z byte addressable protocol controller.

When the packet decoder 121 identifies the data packet as block addressable, the block addressable protocol controller 115 processes the data packet by decoding the header and data in the data packet, and transferring the data to the appropriate storage region of the plurality of storage regions 118a-118n. The block addressable protocol controller 115 may prompt the processor 112 to update the metadata register 114. The packet decoder 121 may also provide feedback or confirmation to the host 104. In some implementations, the block addressable protocol controller 115 is an NVMe Over Fabric block addressable protocol controller.

While the byte addressable protocol controller 116 and block addressable protocol controller 115 are depicted as single logic blocks in FIG. 1 for clarity, the protocol controller may actually comprise a plurality of logic blocks within the SSD controller 108. The byte addressable protocol controller 116 and block addressable protocol controller 115 each have the ability to decode header fields, decode particular transfer protocol commands, and process, execute, and transmit data and commands within the SSD 102 for byte addressable protocol and block addressable protocol, respectively. Further, while the packet decoder 121 is depicted as a separate block in the SSD controller 108 in FIG. 1 for clarity, the packet identification and routing functions of the packet decoder 121 may be implemented as dedicated hardware logic located within the interface 111 or byte controller 116 to increase speed of identification, classification, and packet routing in the SSD.

The Gen-Z SSD 102 includes in the SSD controller 108, a dedicated hardware-based NVMe Over Fabric protocol encoding and decoding acceleration engine, which may be part of the block addressable protocol controller 115. The SSD controller 108 and block addressable protocol controller 115 intercept the NVMe Over Fabric protocol commands and command payloads embedded within Gen-Z command packets. Implementation of the NVMe Over Fabric protocol encoding and decoding logic within the SSD controller 108 leads to lower latency than systems which would include the NVMe Over Fabric protocol logic in CPU software alone. The routing and classification of incoming packets may be implemented in hardware logic in the interface 111 to further decrease latency. The implementation of NVMe Over Fabric protocol within the Gen-Z SSD 102 on top of the Gen-Z protocol fabric uses modified Gen-Z commands to exchange the NVMe Over Fabric protocol commands and data. By using a unique operator classes (OpClasses) and operator codes (OpCodes), which may be manufacturer or vendor specific, a unique identifier is added to the data packet allowing the Gen-Z SSD 102 to classify and use block addressable storage regions within the plurality of storage regions 118a-118n with the conventional NVMe Over Fabric protocol for device discovery, data exchange, and error recovery processes. The packet decoder 121 is equipped to receive and interpret the vendor-defined OpClass packet format including various vendor-defined fields to identify the contents and protocol of the packet. In some implementations, the NVMe Over Fabric protocol can be supplied by a software API on an emulated network interface of the SSD 102.

Encoding of data can occur in the SSD controller 108 for transmitting to the host 104, as well as in the host 104 before transmission of data packets and commands to the SSD 102. Encoding of the data packets and commands will be discussed further below with respect to FIG. 4. Briefly, in order to process the block addressable protocol packets, block addressable protocol commands and data are encapsulated in byte addressable protocol command packets, as will be described below with respect to FIGS. 4-6. Identifiers within the headers of the data packets indicate whether the command is a byte addressable protocol command, or if the byte addressable protocol data packet carries a block addressable command and/or command payload.

Each of the plurality of storage regions 118a-118n is identified as either byte addressable storage region or a block addressable storage region and are identified in metadata register 114. The plurality of storage regions 118a-118n includes first storage region 118a identified as a byte addressable storage region and equipped to store byte addressable data, and second storage region 118b identified as a block addressable storage region and equipped to store block addressable data. In some implementations, the plurality of storage regions 118a-118n are hybrid storage memories such as storage class memory (SCM). In some implementations, the plurality of storage regions 118a-118n are non-volatile flash memories. In some implementations, the plurality of storage regions 118a-118n are dynamic random-access memory (DRAM).

In some implementations, the bus 106 may formed as a serializer/deserializer (SerDes) link communicatively coupling the interface 111 of the SSD 102 to the host interface 120 of the host 104. The SerDes link or interconnect at the bus 106 coupling the SSD 102 to the host 104 is enabled to transmit data packets utilizing either byte addressable and block addressable transfer protocols. For example, in some implementations, the SerDes link is enabled to transmit data packets using Gen-Z byte addressable transfer protocol and data packets using NVMe Over Fabric block addressable protocol. The SSD controller 108 supports storage of data packets using byte or block addressable protocols, by allowing byte addressable commands and block addressable NVMe Over Fabric protocols to run on the same high-speed SerDes link.

The SSD 102 enables the use of both byte addressable and block addressable protocols for storage of data, allowing applications running both byte addressable commands and block addressable protocols, such as NVMe Over Fabric protocol, to function with the SSD 102. Enabling use of both byte addressable commands and block addressable protocols on a single SSD uses a single bus 106, such as a single SerDes link, and requires low numbers of on-chip pins to implement. Conventional systems may require much higher pin counts on the host CPU and the SSD, or require additional parallel buses or SerDes links. Accordingly, the byte addressable command and block addressable protocol enabled SSD has much higher bandwidth and lower latency compared to conventional SSDs which allow only NVMe block storage over SerDes links without the ability to process byte addressable protocols. The SSD 102 may be utilized in consumer electronics, such as cell phones, tablets, set top boxes, dense servers, or high-performance computing (HPC) servers.

The SSD controller 108 may be instantiated as field programmable gate arrays (FPGA) or as an application-specific integrated circuit (ASIC) where functions provided by dedicated hardware logic gates. In some implementations, some functions of the SSD controller 108 may implemented as firmware running on processor 112, or as microcode running on the block protocol controller 115 and byte protocol controller 116. The SSD controller 108 includes the block addressable protocol, such as NVMe Over Fabric protocol encode and decode logic within an ASIC or FPGA. In some implementations, the block addressable protocol, such as NVMe Over Fabric protocol encoding and decoding is completed in the SSD controller 108 in an encode/decode acceleration engine which intercepts or receives the transmitted commands identified as including block addressable protocol. The host 104 also includes embedded CPU resources that enable the host 104 to communicate with the SSD 102 and to encode, decode, and process the block addressable protocol and byte addressable protocol.

Figure 2:
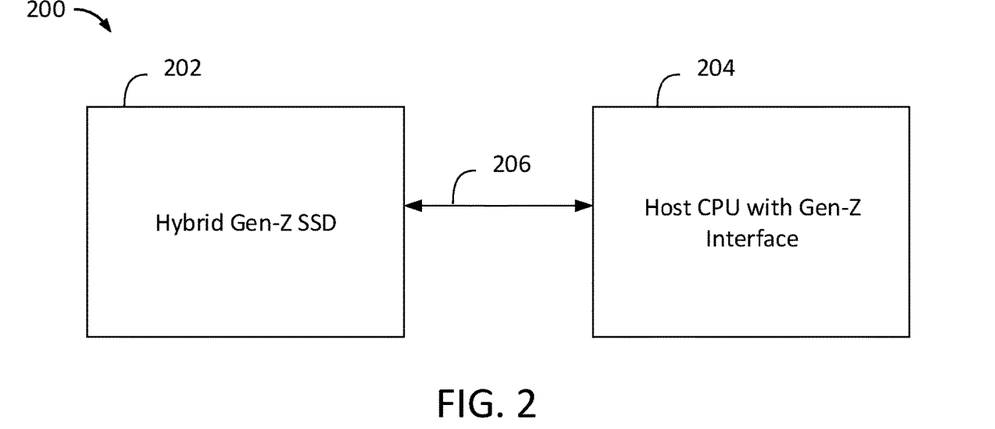
FIG. 2 shows a block diagram of a communication scheme between a hybrid SSD and a host CPU.

FIG. 2 shows a block diagram of a communication scheme 200 between a hybrid SSD 202 and a host CPU 204. A bus 206 (for example, bus 106 in FIG. 1) couples the hybrid SSD 202 (for example, SSD 102 in FIG. 1) to the host CPU 204 (for example, host 104 in FIG. 1). The hybrid SSD 202 includes a processor or controller which has the ability to receive, decode, and process block addressable protocols and byte addressable commands. The host CPU 204 includes an interface for transmitting and receiving data packets to and from the hybrid SSD 202.

In some embodiments, the hybrid SSD 202 is a hybrid Gen-Z SSD which includes the capability to process both Gen-Z byte addressable commands and NVMe Over Fabric block addressable commands. The bus 206 may be a SerDes link or other channel communicatively coupling the hybrid SSD 202 to the CPU host 204 such that byte addressable commands and block addressable data protocols may be transferred between the hybrid SSD 202 and the CPU host 204. In some implementations, the bus 206 may be a Gen-Z SerDes. Both the block addressable protocol commands and byte addressable protocol commands run on top of the bus 206 between the host CPU 204 and hybrid SSD 202. By encapsulating the block addressable protocols commands and command payloads within byte addressable command packets, the Gen-Z SerDes is able to transmit the commands. The hybrid Gen-Z SSD is then able to identify the protocol required for processing of the command and to direct the data packet or command to the appropriate protocol controller within the SSD controller for further processing and storage.

Figure 3:
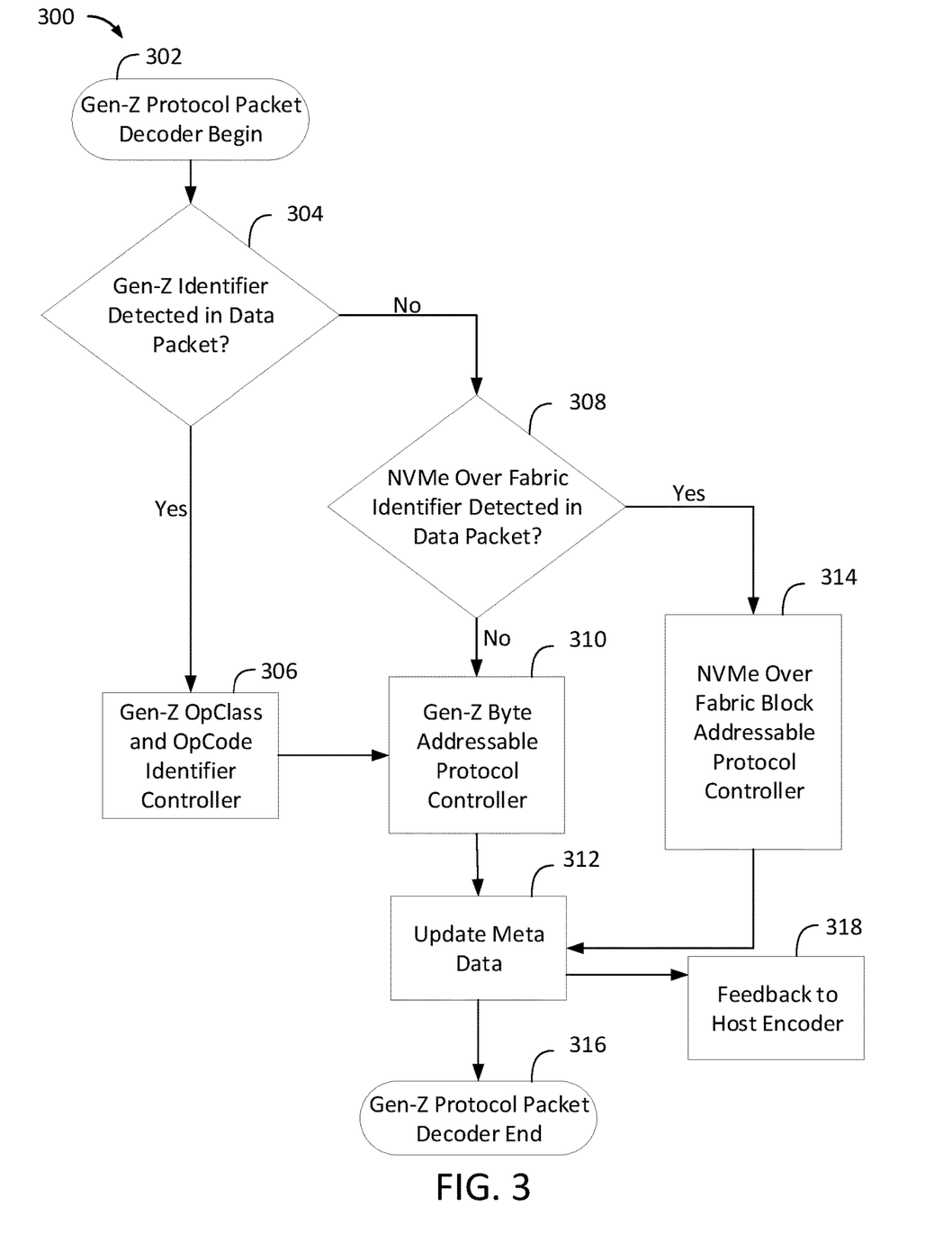
FIG. 3 shows a decision method for decoding a data packet utilizing either byte addressable protocol or block addressable protocol.

FIG. 3 shows a decision chart 300 for a method of decoding a data packet utilizing either byte addressable protocol or block addressable protocol. At step 302, the Gen-Z protocol packet decoder (for example packet decoder 121 in FIG. 1) begins the decoding process when it receives a data packet from the host (for example host 104 in FIG. 1, CPU host 204 in FIG. 2). The Gen-Z protocol packet decoder may be within a general byte addressable protocol decoder (for example byte addressable protocol controller 116 in FIG. 1) or another controller within the SSD controller (for example SSD controller 108 in FIG. 1). The Gen-Z protocol packet decoder is formed as logic, microcode or firmware in the SSD controller 108. At step 304 the decoder determines if there is a Gen-Z identifier detected in the received data packet. In some implementations, the decoder determines whether there is a Gen-Z identifier by decoding the header fields of the data packet and determining that there is a unique identifier indicating that the data packet carries Gen-Z commands and command payloads. The decoder may identify the presence of unique vendor specified OpClasses or OpCodes, as will be further described below. If the decoder determines that the data packet contains a Gen-Z identifier, such as the unique OpClasses and OpCodes, at step 306 the decoder transmits the data packet to the Gen-Z identifier controller within the SSD controller 108. The Gen-Z identifier controller may be within a general byte addressable protocol controller (such as byte addressable protocol controller 116 in FIG. 1) or may be another controller within the SSD controller 108. The Gen-Z identifier controller passes the data packet to the Gen-Z byte addressable protocol controller (for example byte addressable protocol controller 116 in FIG. 1) at step 310 where the data and commands contained in the packet are processed and stored in an appropriate storage region if necessary. At step 312 the metadata is updated, for example in a metadata register (such as metadata register 114 of FIG. 1) to indicate the storage of the command or command payload. The SSD controller 108 sends feedback to the host 104 encoder at step 318 if necessary, and finally the Gen-Z protocol packet decoder method ends at step 316.

If the decoder determines that the data packet does not contain a Gen-Z identifier, at step 308 the decoder determines whether the data packet includes an NVMe Over Fabric identifier. For example, FIGS. 5 and 6 describe such an identifier. The unique identifier in the header fields of the data packet indicates that the data packet includes an NVMe Over Fabric command or payload within the Gen-Z command packet. If the decoder does not identify an NVMe Over Fabric identifier in the data packet header fields, the decoder treats the data packet as a Gen-Z data packet including Gen-Z protocol commands and payloads by default, and continues to step 310 to process the Gen-Z data packet as described above.

If the decoder identifies an NVMe Over Fabric identifier in the data packet header fields, at step 314 the decoder passes the data packet to the NVMe Over Fabric block addressable protocol controller (for example block addressable protocol controller 115 in FIG. 1) within the SSD controller 108. The NVMe Over Fabric block addressable protocol controller 115 processes, executes, and stores the NVMe Over Fabric command and command payload as necessary. The NVMe Over Fabric block addressable protocol controller 115 then updates the metadata register 114 at step 312 or prompts the SSD controller 108 to update the register 114, provides feedback to the host encoder at step 318 as necessary, and finally the method ends at step 316.

While the method for decoding a data packet is described in regard to the specific transfer protocols of Gen-Z byte addressable protocol and NVMe Over Fabric block addressable protocol, the same principles of the method may be used with other pairings of transfer protocols. A first transfer protocol of the SSD 102 and SSD controller 108 may be used to encapsulate a command having a second transfer protocol, and unique identifiers in the header fields of the data packet can be used to identify that the first transfer protocol data packet carries commands and command payloads utilizing the second transfer protocol. In this way, the SSD 102 and SSD controller 108 may be used with commands having multiple transfer protocols to efficiently process commands from a host 104.

In particular, the received data packet may be a Gen-Z Large Read (LDM1), Large Write MSG command, or vendor-defined OpClasses and OpCodes. The vendor-defined OpClasses and OpCodes enable communication of control plane information including SSD internal metadata and controller operations between the host 104 and SSD 102. Such identifiers will be described further below in regard to FIGS. 5 and 6. The host 104 encodes the data packets for transfer to the SSD 102, encapsulating block addressable protocol commands and command payloads (such as NVMe Over Fabric protocol commands) in the byte addressable protocol data packet. The host indicates the presence of the block addressable protocol commands and command payloads in the data packet using the unique identifier. In some implementations, the SSD 102 is also capable of encoding commands for transmission to the host, such as encoding block addressable protocol commands and command payloads within byte addressable protocol command packets.

Figure 4:
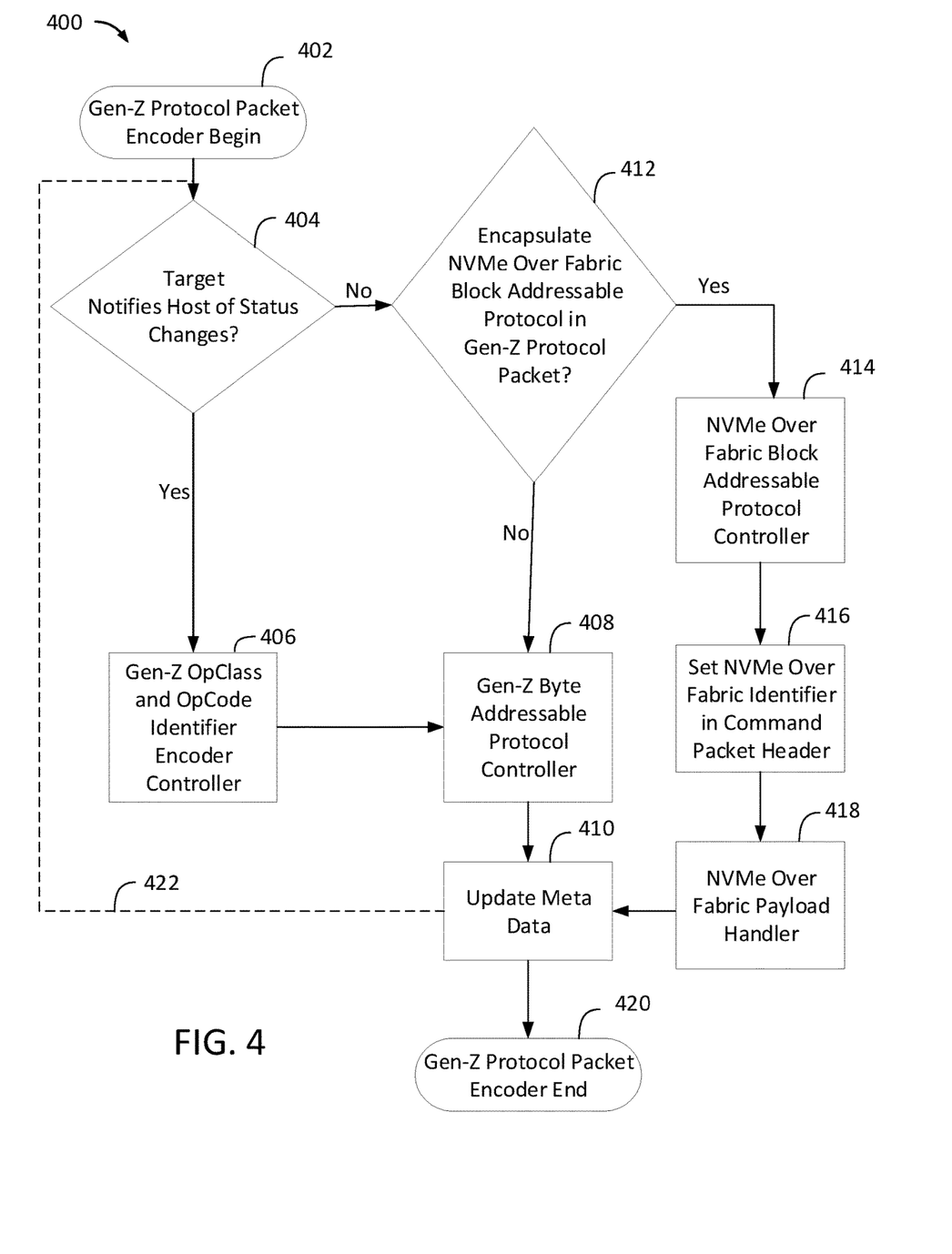
FIG. 4 shows a decision method for encoding a data packet utilizing either byte addressable protocol or block addressable protocol.

FIG. 4 shows a decision method 400 for encoding a data packet utilizing either byte addressable protocol or block addressable protocol. This method typically occurs within the host (for example host 104 in FIG. 1, CPU host 204 in FIG. 2) prior to transmission of data packets to the SSD (for example SSD 102 in FIG. 1, hybrid SSD 202 in FIG. 2), but as described above, in some implementations the SSD 102 is also capable of encoding the data packets. Accordingly, the Gen-Z protocol packet encoder may be located within the host 104 or, in some implementations, within the SSD controller (for example SSD controller 108 in FIG. 1). In some implementations, the Gen-Z protocol packet encoder may be a part of a byte addressable protocol controller within the SSD controller 108 (for example byte addressable protocol controller 116 in FIG. 1).

The method begins at step 402 when the Gen-Z protocol packet encoder begins to encode a command or command payload into a data packet for transmission. At step 404 the host 104 determines whether the target SSD 102 has notified the host of any changes in status of the SSD 102 or storage regions within the SSD 102 which would limit the ability of the SSD 102 to process block addressable protocol commands or command payloads. If there are changes in status, at step 406 the host 104 utilizes the Gen-Z Identifier Encoder Controller to encode the data packet header fields as normal using byte addressable protocols. In some implementations, the Gen-Z identifier encoder controller is a part of byte addressable protocol controller 116 within the SSD controller 108. In some implementations, this may include inserting a unique identifier into the data packet header fields identifying the packet as using Gen-Z protocols, such as a unique vendor-defined OpClasses and/or OpCodes identifying the packet as a Gen-Z protocol packet. The vendor-defined OpClasses and OpCodes may also communicated control plane information such as SSD internal metadata and special controller operation from the host 104 to the SSD 102. In other implementations, the Gen-Z identifier encoder controller may not add any unique identifier to the header fields, and the lack of a unique identifier will be interpreted by the SSD controller 108 as an indication that the data packet uses the Gen-Z protocol. The Gen-Z identifier encoder controller transmits the data packet to the Gen-Z byte addressable protocol controller 116 at step 408 for encoding of the command and command payloads. At step 410 the host 104 updates the metadata of the data packet, and at step 420 the Gen-Z protocol packet encoder is complete, and the data packet may be transmitted to the SSD 102.

If there is no status change at step 404, the host 104 determines whether there is a need to encapsulate NVMe Over Fabric block addressable protocol in a Gen-Z protocol packet. The host 104 determines whether there is an NVMe Over Fabric block addressable command or command payload to be transmitted. If there is no NVMe Over Fabric block addressable command or command payload to be transmitted, the host 104 passes the command to the Gen-Z byte addressable protocol controller 116 at step 408, and proceeds as normal in encoding the Gen-Z byte addressable command.

If the host 104 determines that there is an NVMe Over Fabric block addressable command or command payload to be transmitted, at step 414 the host 104 utilizes the NVMe Over Fabric block addressable protocol controller (for example block addressable protocol controller 115 in FIG. 1) to process the command and command payload and to encapsulate the command and command payload into a Gen-Z command packet. At step 416, the host 104 then sets the identifier in the data packet header field to identify that there is an NVMe Over Fabric block addressable command and command payload in the data packet, for example using a vendor-defined OpClasses or OpCodes as described above to indicate the presence of the NVMe Over Fabric block addressable command and command payload. At step 418 the NVMe Over Fabric payload controller finalizes the data packet and at step 410, the host 104 updates the metadata. The gen-Z protocol packet encoder method is then ended at step 420.

In some implementations, feedback is provided from the updated metadata 410 to the host 104 throughout the process, such that the host 104 uses the metadata to determine if there is a status change at step 404.

As described above in regard to the decoding method in FIG. 3, the method for encoding a data packet is described here in regard to the specific transfer protocols of Gen-Z byte addressable protocol and NVMe Over Fabric block addressable protocol, but the same principles of the method may be used with other pairings of transfer protocols. A first transfer protocol of the SSD 102 and SSD controller 108 may be used to encapsulate a command having a second transfer protocol, and unique identifiers in the header fields of the data packet can be used to identify that the first transfer protocol data packet carries commands and command payloads utilizing the second transfer protocol. In this way, the SSD 102 and SSD controller 108 may be used with commands having multiple transfer protocols to efficiently process commands from a host.

Figure 5:
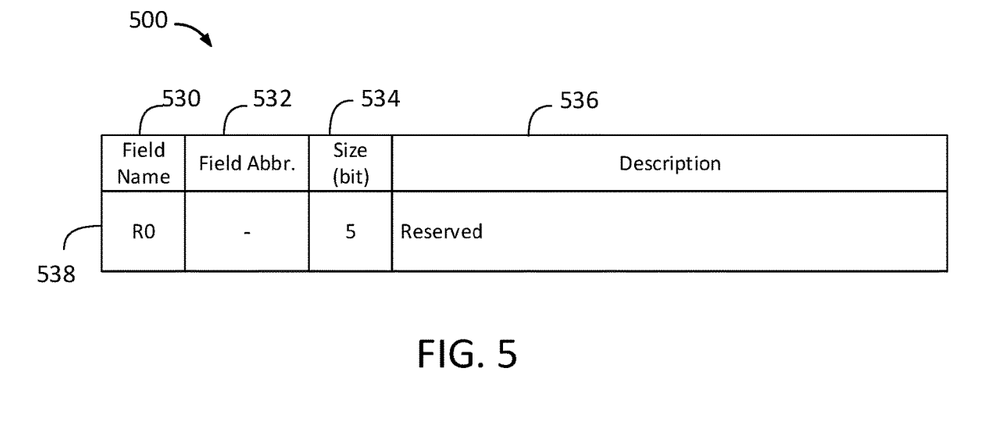
FIG. 5 shows a block diagram of an exemplary byte addressable command packet field.

FIG. 5 shows a block diagram 500 including the details of a particular field of a byte addressable data or command packet for use in identifying the command packet protocol. The particular field of the command packet has a field name 530, a field abbreviation 532, a size in bits 534, and a description 536. Row 538 includes R0 field of 5 bits, with a reserved description. The particular field is a field of a byte addressable command packet, but the field may be used to identify that the byte addressable command packet includes a command payload that carries block addressable commands and payloads.

Although any type of appropriate identifier can be included in a data packet header to identify to the processor or data packet decoder of the SSD (for example within processor 112 or packet decoder 212 in SSD controller 108 in FIG. 1) whether the data packet uses a byte addressable protocol or a block addressable protocol, and example identifier is illustrated here. The identifier may be, for example, a unique value added to the header within the 5 bit R0 reserved field of a command to identify the command as a block addressable command packet.

By utilizing the particular fields of the byte addressable command packet to identify the protocol of the command payload carried by the packet, the packet decoder 121 is able to determine how to process the command, for example to determine which protocol controller (for example byte addressable protocol controller 116 and block addressable protocol controller in FIG. 1) should be used to decode or transmit the command. The packet decoder 121 may be implemented in a processor (for example processor 112 in FIG. 1), in the SSD controller 108, or within an interface of the SSD (for example interface 111 in FIG. 1). The packet decoder 121 may be implemented as hardware logic to quickly process, classify, and route incoming data packets.

Figure 6:
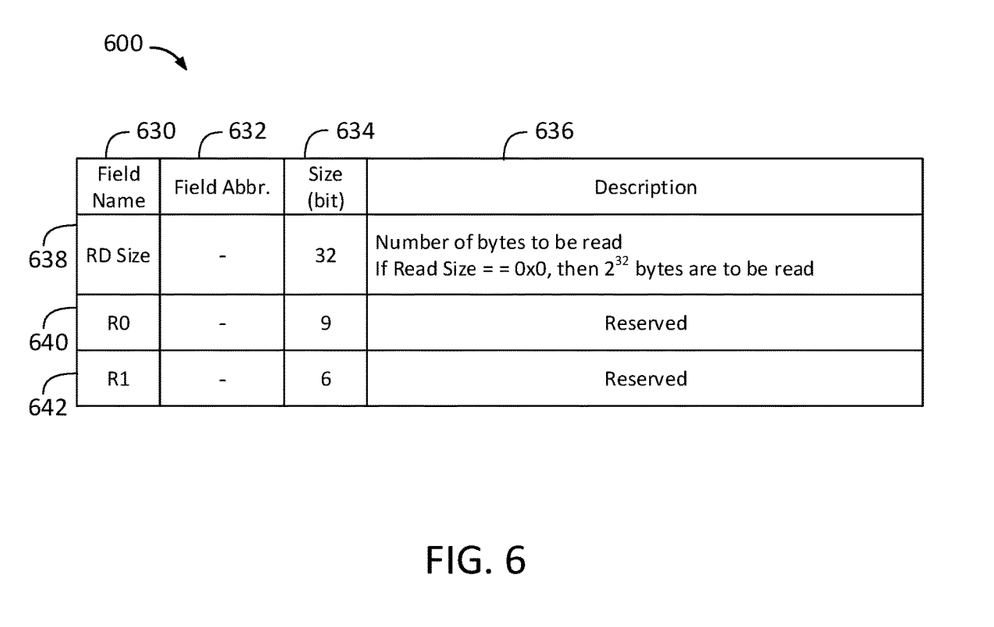
FIG. 6 shows a block diagram of an exemplary read request-specific packet field.

Another example of a particular field of a byte addressable command packet for use in identifying the command packet protocol for a read request is illustrated in FIG. 6. The block diagram 600 in FIG. 6 lists multiple fields as rows, and a field name column 630, field abbreviation column 632, size in bits column 634, and field description column 636. The first row 638 includes additional information for the read request specific command packets. Field RD Size is 32 bits, and the field description for Field RD Size indicates the number of bytes which are to be read based on the read request. The second row 640 includes field R0 which is 9 bits in size and has a description of reserved. The third row 642 includes field R1 which is 6 bits in size and has a reserved description.

Like the generic data packet in FIG. 5, the read-specific data packet may include an identifier to indicate to the packet decoder 121 whether the command payload is block addressable or byte addressable. For example, a unique 6 bit R1 field identifier in the command packet may be utilized to indicate to the packet decoder 121 that the byte addressable command carries a block addressable protocol command and payload. In some implementations, the identifier may indicate that the Gen-Z command packet and Gen-Z command carries an NVMe Over Fabric protocol command and payload. The unique identifier can be any number of bits and may be located in any available field in the data packet header, as programmed by the manufacturer or vendor to enable the SSD controller 108 to locate the identifier. The identifiers illustrated in FIGS. 5 and 6 are exemplary only.

The identifier in the command packet can be read by the packet decoder 121 within the SSD controller 108 or interface 111 to determine that the byte addressable command packet (for example a Gen-Z command packet) carries a block addressable protocol (for example, an NVMe Over Fabric protocol) command and payload. After the packet decoder 121 has made this determination based on the decoding of the command packet header fields, the packet decoder 121 transmits the command to the appropriate protocol controller within the SSD controller 108 for further processing and storage.

To achieve a high wire speed performance, the block addressable protocol (for example NVMe Over Fabric) encoding and decoding acceleration engine as described in FIG. 1 is implemented using dedicated ASIC or FPGA logic. The SSD 102 is thus able to encode and decode byte addressable protocol as well as block addressable protocol if it is encapsulated in the byte addressable protocol.

Figure 7:
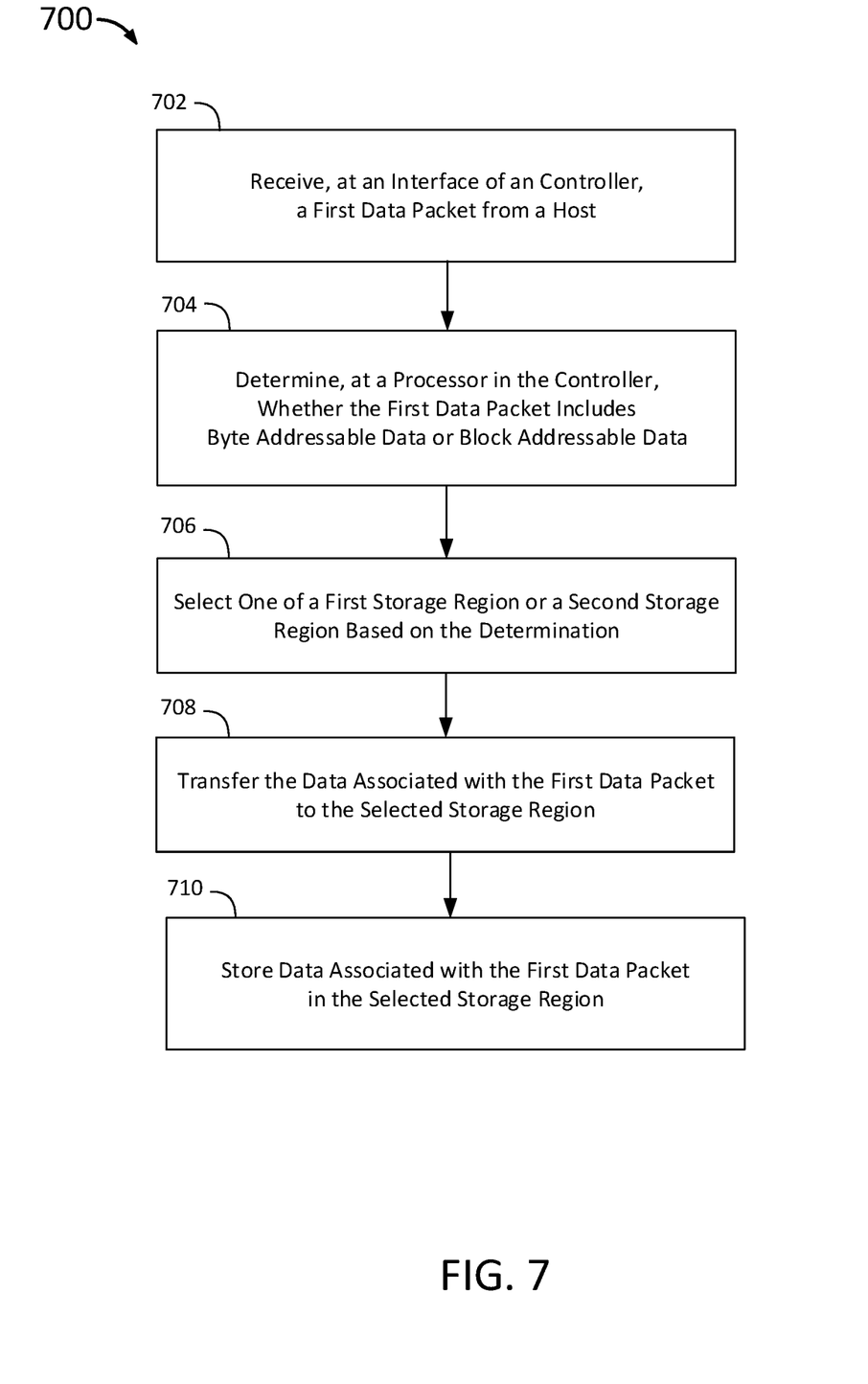
FIG. 7 shows a flow diagram for a method for processing a data packet utilizing either byte addressable protocol or block addressable protocol.

FIG. 7 shows a flow diagram for a method 700 for a method for processing a data packet utilizing either byte addressable protocol or block addressable protocol. At step 702 the SSD controller (for example, SSD controller 108 in FIG. 1) receives a first data packet at an interface of the SSD controller (for example interface 111 in FIG. 1) from a host (for example host 104 in FIG. 1, CPU host 204 in FIG. 2). The first data packet is a byte addressable data packet, but the commands and payload within the data packet may be encoded according to block addressable protocols or byte addressable protocols for storage.

At step 704, the SSD controller 108 determines whether the first data packet includes byte addressable protocol or block addressable protocol data and commands. The SSD controller 108 includes a packet decoder (for example, packet decoder 121 in FIG. 1) or processor 112 (for example processor 112) which decodes the header of the first data packet in order to identify whether the first data packet includes an identifier that indicates the first data packet is encoded according to the block addressable protocols or byte addressable protocols. The packet decoder may be implemented as a separate controller within the SSD controller, or may be implemented as hardware logic in the controller or interface to more quickly classify and route incoming data packets. As described above with respect to FIGS. 5 and 6, a unique identifier may be found within the header of the data packet to indicate the protocol used in the command. The unique identifier may be or may utilize a vendor-defined OpClasses and OpCodes to identify the protocol of the command and command payload. In some implementations, after the SSD controller 108 identifies that appropriate transfer protocol for the data packet, the SSD controller 108 further processes the first data packet utilizing a block addressable protocol controller/decoder (for example block addressable protocol controller 115 in FIG. 1) or byte addressable protocol controller/decoder (for example byte addressable protocol controller 116 in FIG. 1).

At step 706, the packet decoder 121 selects one of a first storage region and a second storage region for storage of the first data packet based on the determination at step 704. The first storage region may be a byte addressable storage region (for example, storage region 118a in FIG. 1), and the second storage region may be a block addressable storage region (for example, storage region 118*b* in FIG. 1). The selection of the first or second storage region is based on the determination of whether the first data packet includes byte addressable data or block addressable data at step 706.

At step 708, the data associated with the first data packet is transferred to the selected storage region of the first storage region and the second storage region. At step 710, the data associated with the first data packet is stored in the selected storage region.

In some implementations, the metadata in a register (for example register 114 in FIG. 1) is updated to reflect the storage location of the first data packet as well as the transfer protocol determined for the first data packet.

Enabling the SSD controller 108 to accept data packets including either byte addressable or block addressable data and to appropriately identify which protocol the data packet uses leads to a versatile SSD that is able to process and store data according to varied protocols. Users can use the SSD in more diverse ways, and with greater efficiency because of the ability to process both block addressable and byte addressable data.

More versatile and efficient SSDs can be provided for use with complex applications if the SSD is equipped to receive and process commands according to both byte addressable protocols and block addressable protocols. By enabling byte addressable commands and block addressable protocols to be processed by a single SSD and transferred to the SSD by a single bus 106, such as a single SerDes link, lower numbers of on-chip pins are required for implementation. Conventional systems may require much higher pin counts on the host CPU and the SSD, or require additional parallel buses or SerDes links. Accordingly, the byte addressable command and block addressable protocol enabled SSD has much higher bandwidth and lower latency compared to conventional SSDs which allow NVMe block storage over SerDes links without byte addressable protocols. SSDs enabled for both byte addressable and block addressable protocols can be used in consumer electronics for greater efficiency of processing and storing commands and data.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A solid state drive (SSD) comprising:
a plurality of storage regions; and
a controller communicatively coupled to the plurality of storage regions, the controller configured to:
receive a data packet from the host, the data packet containing a header identifying a transfer protocol used by the data packet,
determine a type of data contained in the data packet based on the transfer protocol in the header, and
store data associated with the data packet in a storage region of the plurality of storage regions based on the type of data contained in the data packet.

2. The SSD of claim 1, wherein the controller is further configured to:
decode the data packet,
wherein determining the type of data contained in the data packet is based on the decoding of the data packet.

3. The SSD of claim 1, wherein the controller is further configured to:
detect the header of the data packet.

4. The SSD of claim 1, wherein the type of data contained in the data packet comprises block addressable data or byte addressable data.

5. The SSD of claim 1, wherein the transfer protocol comprises a first transfer protocol or a second transfer protocol, the second transfer protocol being different from the first transfer protocol.

6. The SSD of claim 5, wherein the controller is further configured to:
determine the type of data contained in the data packet based on whether the data packet uses the first transfer protocol or the second transfer protocol.

7. The SSD of claim 6, wherein the first transfer protocol is a Gen-Z protocol and the second transfer protocol is a non-volatile memory express (NVMe) Over Fabric protocol.

8. The SSD of claim 7, wherein the controller further comprises an NVMe Over Fabric transfer protocol controller implemented in a field programmable gate array (FPGA) or an application-specific integrated circuit (ASIC).

9. The SSD of claim 1, wherein the plurality of storage regions are implemented as storage class memories (SCMs).

10. The SSD of claim 1, wherein the plurality of storage regions are implemented as non-volatile flash memories.

11. The SSD of claim 1, wherein the controller is further configured to:
transmit the data associated with the data packet to a storage region of the plurality of storage regions over a serializer/deserializer (SerDes) link.

12. The SSD of claim 1, wherein the controller further comprises a register configured to include metadata address information for data stored in the plurality of storage regions, and wherein the controller is further configured to update, in the register, metadata associated with the stored data.

13. A method for storing data in an SSD having a plurality of storage regions configured to store a plurality of types of data, and a controller communicatively coupled to the plurality of storage regions, the method comprising:
receiving a data packet from a host, the data packet containing a header identifying a transfer protocol used by the data packet;
determining a type of data of the plurality of types of data contained in the data packet based on the transfer protocol in the header; and
storing data associated with the data packet in a storage region of the plurality of storage regions based on the type of data contained in the data packet.

14. The method of claim 13, further comprising:
decoding the data packet,
wherein determining the type of data contained in the data packet is based on the decoding of the data packet.

15. The method of claim 13, further comprising:
detecting the header of the data packet.

16. The method of claim 13, wherein the type of data contained in the data packet comprises block addressable data or byte addressable data.

17. The method of claim 13, wherein the transfer protocol comprises a first transfer protocol or a second transfer protocol, the second transfer protocol being different from the first transfer protocol.

18. The method of claim 17, further comprising:
determining the type of data contained in the data packet based on whether the data packet uses the first transfer protocol or the second transfer protocol.

19. The method of claim 18, wherein the first transfer protocol is a Gen-Z protocol and the second transfer protocol is a non-volatile memory express (NVMe) Over Fabric protocol.

20. The method of claim 13, further comprising:
transmitting the data associated with the data packet to a storage region of the plurality of storage regions over a serializer/deserializer (SerDes) link.

21. The method of claim 13, further comprising:
updating a register configured to include metadata address information for data stored, metadata associated with the stored data.

\* \* \* \* \*